(12) United States Patent
Siklosi

(10) Patent No.: US 6,859,971 B2
(45) Date of Patent: Mar. 1, 2005

(54) WINDSHIELD WIPER ASSEMBLY HAVING A WINTER BOOT

(75) Inventor: Tibor Siklosi, Weatherford, TX (US)

(73) Assignee: M Management-Tex, Ltd., Fort Worth, TX (US)

( * ) Notice: Subject to any disclaimer, the term of this patent is extended or adjusted under 35 U.S.C. 154(b) by 0 days.

(21) Appl. No.: 10/160,382

(22) Filed: May 31, 2002

(65) Prior Publication Data
US 2003/0221276 A1 Dec. 4, 2003

(51) Int. Cl.⁷ .............................. B60S 1/32; B60S 1/38; B60S 1/04
(52) U.S. Cl. ........................... 15/250.001; 15/250.361; 15/250.44
(58) Field of Search ....................... 15/250.361, 250.44, 15/250.48, 250.43, 250.001, 250.05, 250.06, 250.07, 250.08, 250.09, 246, 257.01; 150/154; 523/212, 213

(56) References Cited

U.S. PATENT DOCUMENTS

| | | | | |
|---|---|---|---|---|
| 2,728,100 A | * | 12/1955 | Oishei | 15/250.44 |
| 3,199,563 A | * | 8/1965 | Forrest | 15/250.361 |
| 3,696,068 A | * | 10/1972 | Creamer | 524/264 |
| 3,972,850 A | * | 8/1976 | Hamilton et al. | 523/169 |
| 4,342,126 A | | 8/1982 | Neefeldt | |
| 4,360,941 A | * | 11/1982 | Mabie | 15/250.06 |
| 4,457,041 A | * | 7/1984 | Kimber et al. | 15/250.453 |
| 4,683,606 A | | 8/1987 | Sharp | |
| 4,981,637 A | * | 1/1991 | Hyer | 264/146 |
| H1036 H | | 4/1992 | Fisher | |
| 5,283,927 A | * | 2/1994 | Gibbon et al. | 15/250.48 |
| 5,564,157 A | * | 10/1996 | Kushida et al. | 15/250.201 |
| D412,150 S | | 7/1999 | Hardee, Jr. et al. | |
| 6,327,738 B1 | | 12/2001 | Lewis | |
| 6,451,908 B1 | * | 9/2002 | Koonce et al. | 524/591 |

FOREIGN PATENT DOCUMENTS

| | | | | |
|---|---|---|---|---|
| GB | 2144976 | * | 3/1985 | 15/250.44 |
| JP | 61-171643 | * | 8/1986 | 15/250.48 |
| JP | 1-24655 | * | 5/1989 | 15/250.44 |
| JP | 5-8704 | * | 1/1993 | 15/250.361 |

OTHER PUBLICATIONS

Copy of p. 435, inlcuding definition of "elastomer" from Webster's New World Dictionary, Third College Edition, 1988.*

Author Unknown, Winter Wiper Blades Combat Harsh Elements To Promote Safe Driving, Date Unknown, 2 pages, http://www.carcarecouncil.org/fw01–hars.htm.

Author Unknown, Windshield Wiper Blades on the Fast Track, Date Unknown, 4 pages, http://www.cadinfo.net/editorial/Pylon.htm.

* cited by examiner

Primary Examiner—Gary K Graham
(74) Attorney, Agent, or Firm—Patton Boggs LLP

(57) ABSTRACT

A wiper assembly having a wiper frame and a wiper boot is provided. The wiper boot includes an upper wall integrally connected between two side walls. A lower leg is integrally connected to each side wall at an end opposite that of the upper wall. Each lower leg runs transversely and inwardly from the side walls, the lower legs integrally connecting to a u-shaped wall. The upper wall, the side walls, the lower legs, and the u-shaped wall define a cavity that receives the wiper frame. The wiper boot is made from silicone elastomer that preferably includes approximately 30 to 60 weight percent of polyvinylmethylsiloxane, approximately 15 to 40 weight percent of filler, approximately 0.1 to 10 weight percent of pigment, and approximately 0.1 to 10 weight percent of catalyst.

12 Claims, 3 Drawing Sheets

WINDSHIELD WIPER ASSEMBLY HAVING A WINTER BOOT

BACKGROUND OF THE INVENTION

1. Field of the Invention

This invention relates generally to windshield wiper assemblies, and more particularly to a winter boot for protecting a windshield wiper assembly from harsh environmental conditions.

2. Description of Related Art

A critical problem encountered by windshield wiper designers has been how to maintain contact between a wiper blade and a windshield at all times throughout the windshield wiping process. One complicating factor is that a particular wiper blade may be designed to fit on many different automobile models. Different automobiles typically have windshields of different sizes and shapes, and providing contact between the windshield and all parts of a wiper blade can be a difficult task. One design solution to the problem has been to provide wiper frames having spring-like flexural members attached to the frames. The flexural members exert forces at various points along the wiper blade to insure contact of the blade with the windshield.

A bare windshield wiper is rendered largely ineffective during winter weather when snow, sleet, or ice accumulate on the flexural members of wiper frames. The movement of the flexural members is hindered which prevents the frame from applying the correct forces to the wiper blade. Since the wiper blade does not fully contact the windshield, the wiping effectiveness of the wiper blade is significantly decreased.

The windshield wiper boot, sometimes called a "winter boot," has been used to protect windshield wiper frames that are subjected to harsh winter weather conditions such as snow, sleet, and ice. The primary purpose of the winter boot is to prevent ice and snow from accumulating on the flexural members and other joints of a windshield wiper frame. Typical winter boots are made of natural rubber or ethylene propylene diene monomer (EPDM) because the materials provide good tear resistance and are easy to manufacture. The natural rubber and EPDM used in wiper blades, however, perform poorly when subjected to low temperatures such as those encountered in freezing climates. For example, when natural rubber is subjected to temperatures around 0° C. (32° F.), the material reaches a glass transition temperature and begins to lose flexibility. Since the winter boot surrounds the wiper frame, the decreased flexibility of the winter boot hinders the proper movement of the flexural members and joints of the wiper frame. The overall result is poor contact between the wiper blade and the windshield, which reduces the wiping ability of the wiper blade. Additionally, EPDM and natural rubber deteriorate rapidly when exposed to ultra-violet radiation and ozone.

A need exists, therefore, for a winter boot made from a material having good tear resistance and superior resistance to ultra-violet radiation, ozone, and extreme temperatures, especially low temperatures. A need also exists for a wiper assembly having a wiper frame that is covered by a winter boot having the above-mentioned properties. Finally, a need exists for a winter boot that is easily manufactured.

BRIEF SUMMARY OF THE INVENTION

The problems presented by natural rubber and EPDM winter boots are solved by the present invention. A protective wiper boot is provided that includes a flexible cover made of a silicone elastomer compound. Preferably, the flexible cover conforms to the shape of a wiper frame on which it is installed. The composition of the silicone elastomer preferably includes approximately 30 to 60 weight percent of polyvinylmethylsiloxane, approximately 15 to 40 weight percent of filler, and approximately 0.1 to 10 weight percent of catalyst.

In one embodiment, the flexible cover includes an upper wall disposed between two side walls. A lower leg is integrally connected to each of the side walls, the lower legs being joined by a u-shaped wall. Together, the upper wall, the side walls, the lower legs, and the u-shaped wall define a cavity that is adapted to receive a wiper frame. Again, the flexible cover is made of silicone elastomer.

In another embodiment, a wiper assembly includes a wiper frame and a wiper boot. The wiper boot includes an upper wall disposed between two side walls. A lower leg is integrally connected to each of the side walls, the lower legs being joined by a u-shaped wall. Together, the upper wall, the side walls, the lower legs, and the u-shaped wall define a cavity that is adapted to receive a wiper frame. A t-slot is defined by the u-shaped wall on a side of the u-shaped wall opposite the cavity. The t-slot is adapted to receive an upper portion of wiper blade after the wiper boot is installed on the wiper frame. The wiper boot is made from silicone elastomer.

Other objects, features, and advantages of the present invention will become apparent with reference to the drawings and detailed description that follow.

BRIEF DESCRIPTION OF THE DRAWINGS

FIG. 5 illustrates a cross-sectional view of the wiper blade, blade receiving member, and protective wiper boot of FIG. 1 taken at V—V.

DETAILED DESCRIPTION OF THE PREFERRED EMBODIMENT

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
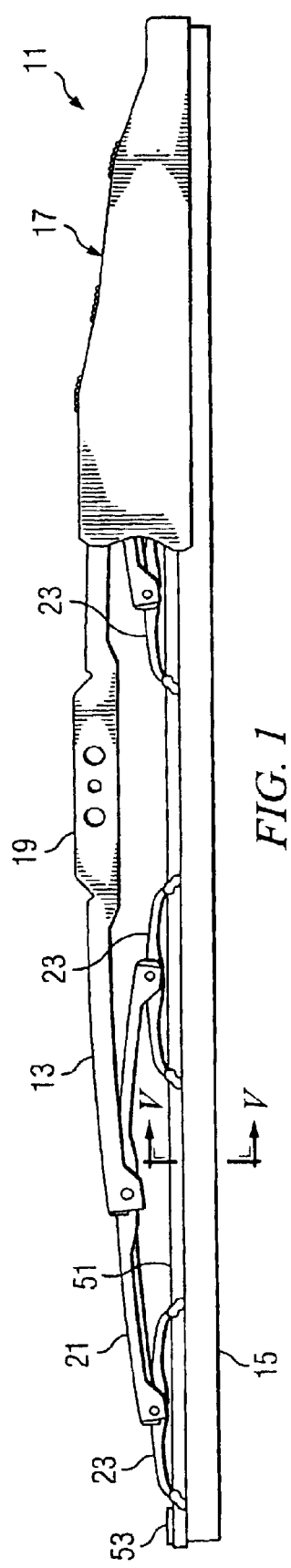
FIG. 1 illustrates a front view of a wiper assembly according to the present invention, the wiper assembly including a wiper frame having a blade receiving member, a wiper blade, and a protective wiper boot made of silicone elastomer.

Referring to FIG. 1 in the drawings, a wiper assembly 11 having a wiper frame 13, a wiper blade 15, and a protective winter boot, or wiper boot 17 is illustrated. Wiper frame 13 is of traditional design and includes a primary frame portion 19, two secondary frame portions 21, and a plurality of tertiary frame portions 23. Secondary and tertiary frame portions 21, 23, also referred to as "bridges," are flexural members that help maintain contact between wiper blade 15 and a windshield (not shown). Secondary frame portions 21 are pivotally connected to both ends of primary frame portion 19. Tertiary frame portions 23 are pivotally connected to each end of the secondary frame portions 21. Together, the primary, secondary, and tertiary frame portions exert forces on multiple portions of wiper blade 15 so that the wiper blade 15 contacts, and thereby wipes, a windshield more effectively.

When installed on an automobile, airplane or other vehicle having a windshield, the primary frame portion 19 is pivotally connected to a wiper arm (not shown). The wiper arm either rotates or translates relative to the windshield such that the wiper blade is dragged across the surface of the windshield. As the wiper blade moves across a windshield having a contour, the force exerted at the end of each frame portion (i.e. primary 19, secondary 21, or tertiary 23) coupled with the ability of each frame portion to pivot relative to the wiper arm and the other frame portions allows the wiper blade 15 to bend and conform to the shape of the windshield.

Since the ability of the frame portions 19, 21, 23 to pivot plays a major role in the ability of the wiper blade 15 to maintain contact with the windshield, it is important that the points of pivotal connection remain clean and properly lubricated. Weather conditions such as rain typically do not limit the ability of the frame portions 19, 21, 23 to pivot. Winter conditions, such as snow, sleet, and ice, can penetrate and clog the pivotal connection points of the frame portions, thereby significantly reducing the ability of the frame portions to pivot and decreasing the overall effectiveness of the wiper blade 15.

Figure 2:
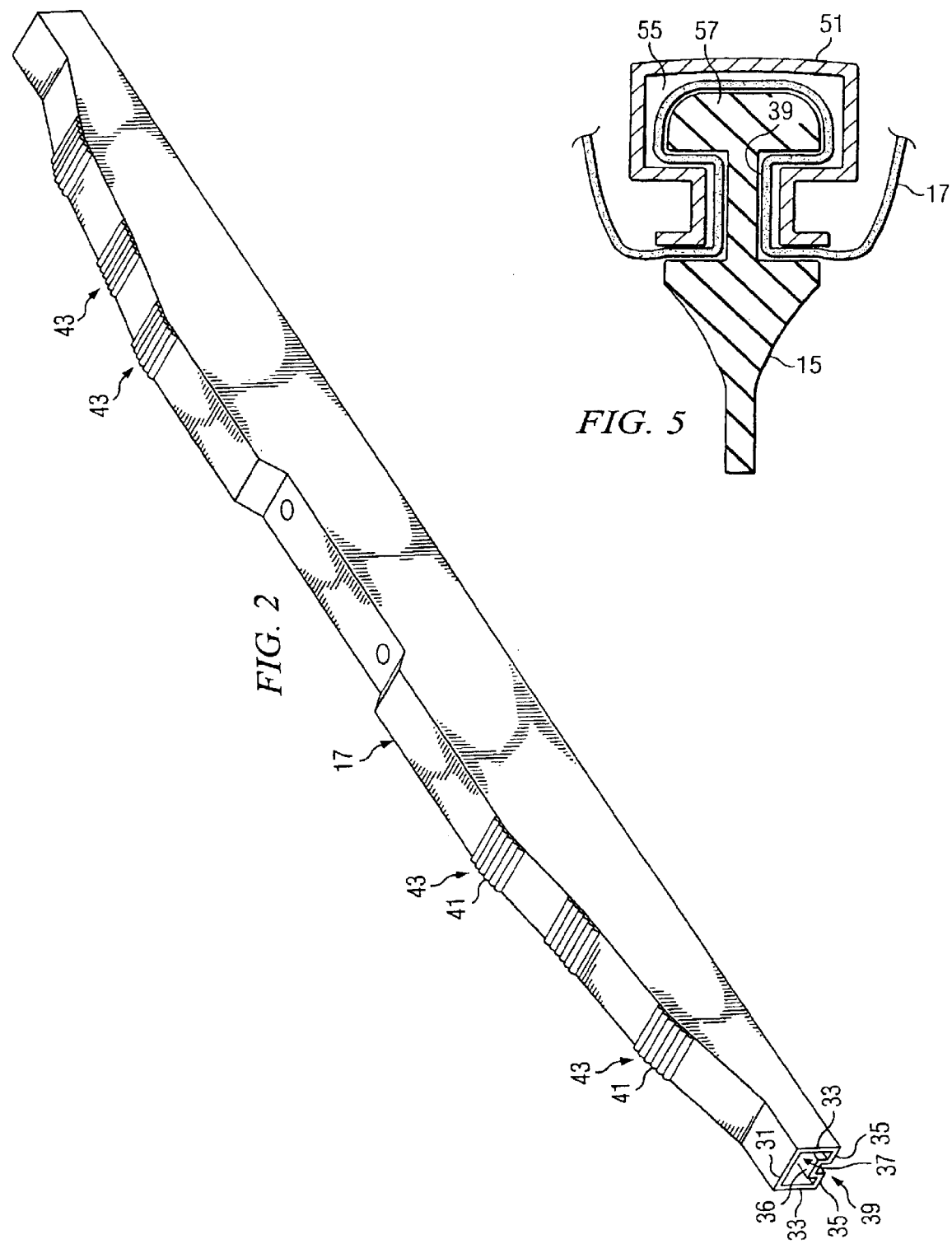
FIG. 2 depicts a perspective view of the protective wiper boot of FIG. 1.
Figure 3:
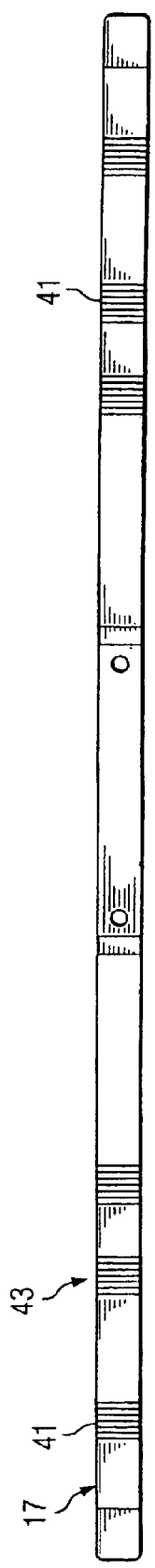
FIG. 3 illustrates a top view of the protective wiper boot of FIG. 2.
Figure 4:
FIG. 4 depicts a front view of the protective wiper boot of FIG. 2.

Referring to FIGS. 2–4 in the drawings, protective wiper boot 17 alleviates the problems presented by harsh weather conditions by providing an upper wall 31 integrally connected to two side walls 33. Upper wall 31 is preferably contoured such that it conforms to the shape of wiper frame 13. A lower leg 35 is integrally connected to each side wall 33 at an end opposite that of upper wall 31. Each lower leg 35 runs transversely and inwardly from side walls 33, the lower legs 35 integrally connecting to a u-shaped wall 36. Together, upper wall 31, side walls 33, lower legs 35, and u-shaped wall 36 define a cavity 37 having an opening at both ends of wiper boot 17. A channel 39 is defined by the u-shaped wall 36 on a side of u-shaped wall 36 opposite that of cavity 37.

A person having ordinary skill in the art will recognize that the thickness of the "walls" (i.e. upper wall 31, side walls 33, lower legs 35, and u-shaped wall 36) demonstrated in FIG. 2 are for illustrative purposes and the actual thickness of the walls could be thicker, but are preferably much thinner than those shown in FIG. 2. In fact, the use of thinner walls provides more flexibility for the boot, thereby increasing the performance of the wiper frame and wiper blade. However, the walls need to be thick enough to provide adequate strength to combat the various forces encountered during use. In a preferred embodiment, the thickness of the walls is about 0.3 millimeters.

A plurality of ridges 41 are disposed at a plurality of ridge areas 43 on upper wall 31 to strengthen wiper boot 17. Upper wall 31 is thicker in ridge area 43, and the location of ridges 41 generally corresponds to areas of wiper frame 13 that experience increased pivotal movement. As frame portions 19, 21, 23 pivot, the thicker material at ridge areas 43 prevent premature wear or failure of wiper boot 17.

Referring again to FIG. 1 and also to FIG. 5 in the drawings, wiper frame 13 includes a spline, or blade receiving member 51 slidingly connected to tertiary frame portions 23. An end cap 53 is rigidly connected at both ends of blade receiving member 51 to secure the blade receiving member 51 to wiper frame 13. Blade receiving member 51 includes a t-slot 55 configured to receive an upper portion 57 of wiper blade 15 such that wiper blade 15 is secured to the wiper frame.

Wiper boot 17 is preferably installed on wiper frame 13 by inserting wiper frame 13 inside cavity 37 through the opening at either end of wiper boot 17. The walls (upper wall 31, side walls 33, lower legs 35, and u-shaped wall 36) at each of the openings of the wiper boot 17 sealingly engage end cap 53 at each end of the wiper frame 13. Although the seal between the walls and the end cap 53 is not perfect, it prevents snow and ice from accumulating on wiper frame 13. The u-shaped wall 36 is tucked inside t-slot 55 of blade receiving member 51 such that channel 39 is located within t-slot 55. Finally, upper portion 57 of wiper blade 15, the shape of which resembles the t-slot, is pressed into the channel 39 and t-slot 55 to secure wiper blade 15 to wiper frame 13. As wiper blade 15 is pressed into t-slot 55, the shape of wiper boot 17 within the t-slot, especially the shape of u-shaped wall 36, conforms generally to the shape of upper portion 57 of wiper blade 15.

After installation on wiper frame 13, wiper boot 17 completely surrounds and protects primary frame portion 19, secondary frame portions 21, and tertiary frame portions 23 and their respective pivotal connection points from ice, snow, and sleet accumulation. The barrier provided by wiper boot 17 is even present between wiper blade 15 and blade receiving member 51 since u-shaped wall 36 is tucked within t-slot 55.

Wiper boot 17 is preferably formed by any molding process known in the industry such as compression molding, transfer molding, injection molding, or liquid injection molding. The wiper boot 17 is made of a silicone elastomer compound that preferably includes approximately 30 to 60 weight percent of polyvinylmethylsiloxane, approximately 15 to 40 weight percent of filler, approximately 0.1 to 10 weight percent of a catalyst, and approximately 0.1 to 10 weight percent of pigment. Preferably, the filler material is fumed silica, however, other fillers could be used including, but not limited to, precipitated silica, ground quartz, calcium carbonate, or talc. The catalyst is preferably chloroplatanic acid, but other catalysts could be used including, but not limited to, dicumyl peroxide; di-2,4-dichlorobenzoyl peroxide; or 2,5-dimethyl-2, 5 di-(tert-butylperoxy) hexane. Finally, a preferred pigment is titanium dioxide. A person skilled in the art will recognize that a pigment is not required, but will often be used to give a particular color to the finished wiper boot 17. Other pigments could include red iron oxide, black iron oxide, or carbon black.

A silicone elastomer wiper boot 17 provides many advantages, some of which include superior resistance to ultra-violet radiation, ozone, and extreme temperatures. Previous wiper boots have been made from natural rubber and other non-silicone materials such as EPDM. One of the main problems with natural rubber and EPDM is that the materials have relatively high glass transition temperatures compared to silicone elastomers. When temperatures drop to freezing and below, natural rubber and some grades of EPDM become inflexible, thereby hindering performance of the wiper blade. Silicone elastomers, however, can remain flexible at temperatures as low as about −80° F.

Although silicone products have been used in wiper blades, the poor tear resistance of silicone elastomers has prevented use of silicone with winter boots. Since winter boots are thinly manufactured covers, silicone elastomers would not have been used prior to the present invention. The present invention provides a silicone elastomer compound that overcomes previous tear resistance problems and provides superior resistance to winter weather conditions, especially extremely cold temperatures.

Even though many of the examples discussed herein are applications of the wiper assembly having a traditional wiper frame used with a wiper boot, the wiper boot could be used in combination with any size or style of wiper frame needing protection from harsh weather conditions. A person having skill in the art will also recognize that the wiper boot can have many different shapes and sizes to fit various wiper frames. In fact, the various "walls" that form the winter boot could be more rounded, thereby making the upper walls, the side walls, the lower legs, and the u-shaped wall indistinguishable.

From the foregoing, it will be recognized that the wiper boot of the present invention provides a superior system for protecting a wiper frame from harsh weather conditions including snow, sleet, and ice. The installation of the wiper boot on the wiper frame prevents the snow, sleet, and ice from penetrating the pivotal joints of the wiper frame, which allows the frame to function properly by maintaining contact between the wiper blade and the windshield. The silicone elastomer composition of the wiper boot provides superior resistance to environmental conditions such as ultra-violet radiation, ozone exposure, and extreme temperatures.

It should be apparent from the foregoing that an invention having significant advantages has been provided. While the invention is shown in only a few of its forms, it is not just limited but is susceptible to various changes and modifications without departing from the spirit thereof.

I claim:

1. A protective wiper boot comprising:
   a flexible cover configured to receive a windshield wiper frame;
   wherein the flexible cover is made of silicone elastomer and said silicone elastomer further includes:
     polyvinylmethylsiloxane, from about 30 to 60 weight percent;
     a fumed silica filler, from about 15 to 40 weight percent;
     a catalyst, from about 0.1 to 10 weight percent; and
     wherein no other fillers are used.

2. The protective wiper boot according to claim 1 further comprising a pigment, from about 0.1 to 10 weight percent.

3. The protective wiper boot according to claim 2, wherein the pigment is titanium dioxide.

4. The protective wiper boot according to claim 1, wherein the catalyst is chloroplatanic acid.

5. A protective wiper boot comprising:
   a flexible cover having an upper wall integrally connected between two side walls, a pair of lower legs, each lower leg being integrally connected to one of the side walls, and a u-shaped wall integrally connected between the two lower legs;
   wherein the upper wall, the side walls, the lower legs, and the u-shaped wall define a cavity adapted to receive a wiper frame;
   wherein the flexible cover is made from silicone elastomer and said silicone elastomer further includes:
     polyvinylmethylsiloxane from about 30 to 60 weight percent;
     a fumed silica filler, from about 15 to 40 weight percent;
     a catalyst, from about 0.1 to 10 weight percent; and
     wherein no other fillers are used.

6. The protective wiper boot according to claim 5 further comprising a pigment, from about 0.1 to 10 weight percent.

7. The protective wiper boot according to claim 6, wherein the pigment is titanium dioxide.

8. The protective wiper boot according to claim 5, wherein the catalyst is chloroplatanic acid.

9. A wiper assembly comprising:
   a wiper frame;
   a wiper boot having a flexible cover that includes a cavity for receiving the wiper frame;
   wherein the wiper boot is made from silicone elastomer and said silicone elastomer further includes:
     polyvinylmethylsiloxane, from about 30 to 60 weight percent;
     a fumed silica filler, from about 15 to 40 weight percent;
     a catalyst, from about 0.1 to 10 weight percent; and
     wherein no other fillers are used.

10. The wiper assembly according to claim 9 further comprising a pigment, from about 0.1 to 10 weight percent.

11. The wiper assembly according to claim 10, wherein the pigment is titanium dioxide.

12. The wiper assembly according to claim 9, wherein the catalyst is chloroplatanic acid.

* * * * *